US008805431B2

(12) United States Patent
Vasavada et al.

(10) Patent No.: US 8,805,431 B2
(45) Date of Patent: Aug. 12, 2014

(54) APPARATUS AND METHOD FOR INITIATING AND SHARING INCIDENT INFORMATION IN A COMMUNICATION SYSTEM

(75) Inventors: Pranav L. Vasavada, Arlington Heights, IL (US); Patrice A. Bedford, Plantation, FL (US); Ovidiu A. Capota, Schaumburg, IL (US); Michael L. Charlier, Palatine, IL (US); Chi T. Tran, Weston, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 23 days.

(21) Appl. No.: 13/562,657

(22) Filed: Jul. 31, 2012

(65) Prior Publication Data
US 2014/0038668 A1  Feb. 6, 2014

(51) Int. Cl.
*H04B 7/00* (2006.01)

(52) U.S. Cl.
USPC ............. 455/518; 455/404.1; 455/404.2; 455/519

(58) Field of Classification Search
CPC ......... H04W 4/046; H04W 4/08; H04W 4/10; H04W 4/22; H04W 84/08
USPC ............. 455/404.1, 404.2, 414.1, 418, 420, 455/414.2, 456.1, 456.2, 456.3, 459, 517, 455/518, 519, 575.9; 340/573.1, 426.1, 340/531; 348/14.01, 14.02, 143, 211.2
See application file for complete search history.

(56) References Cited

U.S. PATENT DOCUMENTS

| | | |
|---|---|---|
| 6,204,844 B1 | 3/2001 | Fumarolo et al. |
| 2004/0257208 A1 | 12/2004 | Huang et al. |
| 2006/0165160 A1 | 7/2006 | Winningstad et al. |
| 2007/0377596 | 2/2007 | Shaffer et al. |
| 2007/0111754 A1 | 5/2007 | Marshall et al. |
| 2008/0061991 A1 | 3/2008 | Urban et al. |
| 2008/0108339 A1 | 5/2008 | Shaffer et al. |
| 2008/0220765 A1 | 9/2008 | Chu et al. |

(Continued)

FOREIGN PATENT DOCUMENTS

| | | |
|---|---|---|
| EP | 2345262 A2 | 7/2011 |
| WO | 2010042708 A2 | 4/2010 |

OTHER PUBLICATIONS

VIDMIC Software—Extracted from http://www.ehsequipment.com/vidmic/index.php—Jul. 30 2012—Copyright 2010—2 pages.

(Continued)

*Primary Examiner* — Jean Gelin
(74) *Attorney, Agent, or Firm* — Barbara R. Doutre

(57) ABSTRACT

A communication system (100) provides automated incident alerts to a radio, automated video recording of the incident, dynamic formation of a talkgroup, and automatic sharing of the incident information amongst members of the talkgroup. The automated alert triggers video recording of incident information from a portable radio, radio accessory or vehicular radio (102). The recorded information of the incident scene is used to dynamically form a talkgroup (102, 104, 106, 108) based on members having the appropriate skills or equipment to handle the particular incident. As members of the talkgroup (104, 106, 108) proceed to the incident scene, each member is able to view real-time video of events occurring at the scene using their portable radios, vehicular radios, or radio accessory. The recordings may also be logged and stored for future analytics.

29 Claims, 7 Drawing Sheets

(56) References Cited

U.S. PATENT DOCUMENTS

| | | | |
|---|---|---|---|
| 2009/0174547 A1 | 7/2009 | Greene et al. | |
| 2009/0189981 A1* | 7/2009 | Siann et al. | 348/143 |
| 2011/0237217 A1 | 9/2011 | Monks et al. | |
| 2012/0077455 A1 | 3/2012 | Yeh | |
| 2013/0128067 A1* | 5/2013 | Boland et al. | 348/211.2 |
| 2013/0265378 A1* | 10/2013 | Abuan et al. | 348/14.02 |

OTHER PUBLICATIONS

Police Camera Body Worn Wolfcom 3rd Eye Fireeye HD-3G—Extracted from : http/www.wolfcomusa.com—Copyright 2011, Wolfcom Enterprises—15 pages.

Police Cameras—Extracted from http://www.wondcam.com/police-cameras.html—Jul. 30 2012—Copyright 2007-2012, Wondcam.com—2 pages.

Patent Market Place—Search—EP2,345,262—Adaptive Location Data Buffering for Location-Aware Applications—1pp (See also cited Foreign Reference WO 2010/042708).

Counterpart International Application No. PCT/US2013/050430—International Search Report With Written Opinion, mailed Nov. 22, 2013—15 pp.

Revealmedia,Com—"Body Worn Video Wireless Solution"—XP055088456—Published Jul. 25, 2011—3 pages.

"High Resolution 450TVL Headset Camera W/ Mic," accessed at http://www.wolfcominnovations.com/products/headset-cam-er-14nck.htm, accessed on Apr. 21, 2014, 4 pages.

* cited by examiner

APPARATUS AND METHOD FOR INITIATING AND SHARING INCIDENT INFORMATION IN A COMMUNICATION SYSTEM

FIELD OF THE INVENTION

The present invention relates generally to communication systems and more particularly to emergency alerts and the formation of talkgroups for sharing incident information.

BACKGROUND

Public safety providers, such as law enforcement, fire rescue, and emergency service providers, typically utilize two-way radio communication systems when handling emergency incidents. Public safety personnel, such as police officers, may only have limited information pertaining to an incident prior to arrival upon the incident scene. While dispatch centers convey audio messages pertaining to the incident over a network, this information may not always be sufficient to provide a proper assessment of the incident. Upon arrival at the incident scene, an officer may not be as well prepared to address and respond to the incident as he or she could be if better incident information were available.

Accordingly, there is a need for an improved means for acquiring and sharing incident scene information in a communication system.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
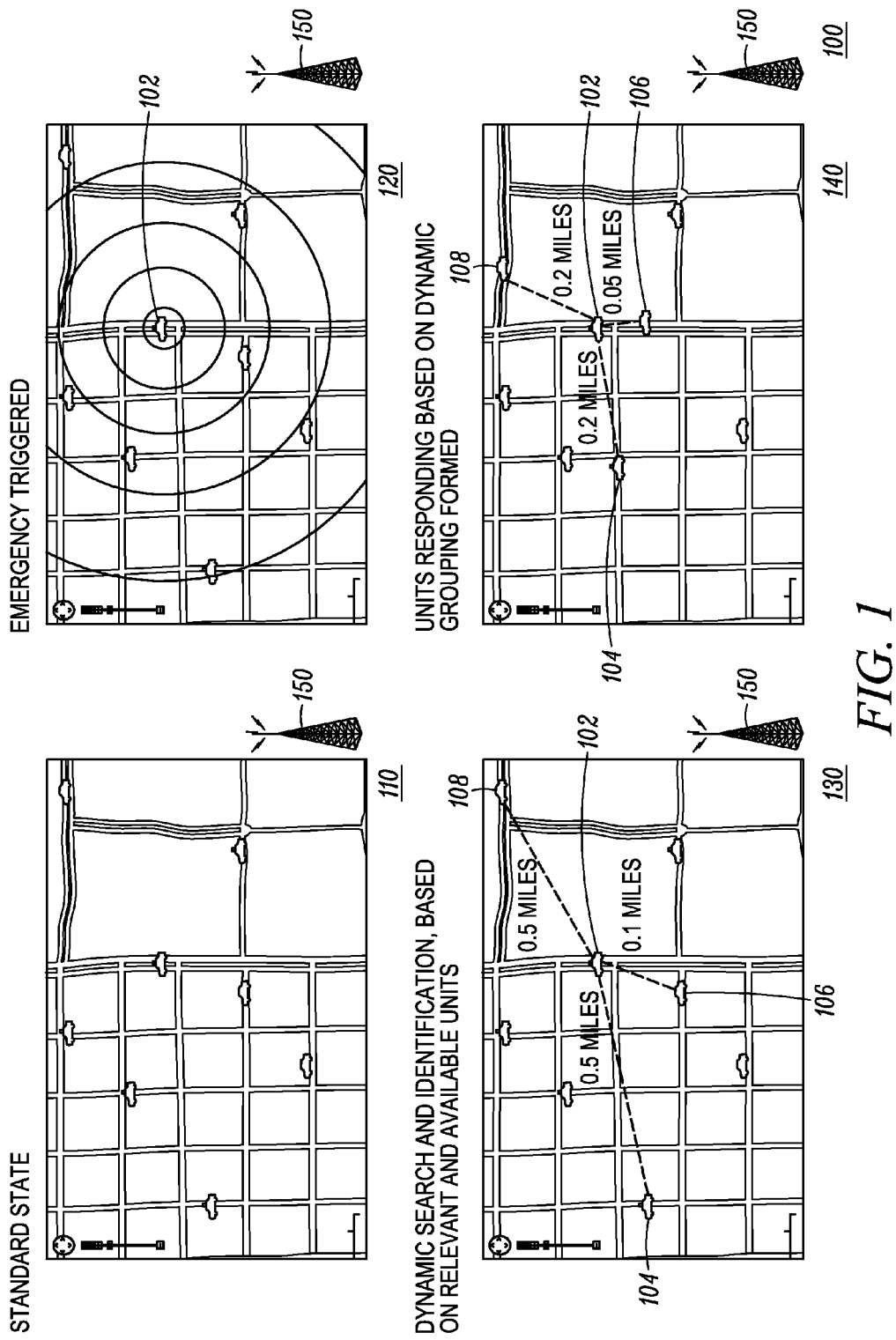
FIG. 1 is a diagram of a communication system transitioning through different states while operating in accordance with the various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in apparatus components and method steps for managing public safety resources and sharing incident information in response to an incident event trigger. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Briefly, there is provided herein a communication system generating an incident event alert which triggers an automatic recording of video information. The incident event alert further triggers the automatic formation of a talkgroup within which the video information is shared. Video acquired by an incident radio is shared with at least one other radio. The automatic formation of a talkgroup and the sharing of video information better prepares responders to attend to an incident. The formation of the talkgroup is based on the type of incident indicated by the trigger. A further embodiment provides individual video recording by each unit within the talkgroup responding to the incident. Thus, incident information can be shared in a real-time manner for improved response to an emergency. The video recordings with associated audio and contextual data can also be stored for evidentiary purposes. The various embodiments facilitate the management of public safety resources responding to an emergency.

FIG. 1 is a diagram a communication system 100 transitioning through different operating states 110, 120, 130, 140 while operating in accordance with the various embodiments. Communication system 100 operates within a network such as a long term evolution (LTE) network, a P25 network, Wifi, or other network capable of handling two-way radio and video data. For the purposes of this application two-way radios comprise radios which utilize a push-to-talk (PTT) switch for half-duplex (also referred to as simplex) audio communication. The communication system 100 comprises a plurality of radio units, which may be vehicular and/or portable handheld units, operating in a public safety radio network. Each radio unit comprises a camera, or other visual recording capability, operatively coupled thereto for recording video. For the purposes of this application a video recording may further comprise audio from the scene. The communication system 100 integrates streaming video along with local and network storage functionality. Operating states 110, 120, 130 and 140 are also labeled as 1, 2, 3, and 4.

Referring to operating state 110, the plurality of radio units are communicating over the network utilizing two-way radio communication. A communications tower 150 broadcasts transmissions amongst the plurality of radios, and a control center, such as a dispatch control center shown later, manages resource assignments of the radios within the communication system 100 in accordance with the various embodiments. In FIG. 1, the radio units are represented as vehicular radio units, however handheld radio units having visual recording capability may also be utilized as will be further described later.

Moving to state 120, a radio 102 amongst the plurality of radio units is triggered by an incident event alert in accordance with the various embodiments. For the purposes of this application, an incident event alert automatically triggers an input to the radio, either by wired or wireless communication, without manual input from the user. The incident event alert may be based on a predetermined event trigger scenario recognized by the radio. For example, a gun being pulled from a holster may be an event which triggers a switch input at the radio. Predetermined audio events may also enable the trigger, such a gunshot or a voice command. As another example, a sensor indicating a toxic condition, radiation condition or other hazardous condition in the area surrounding the radio may automatically trigger an incident alert input to the radio. The sensor need not be located in the radio but may be part of a radio ecosystem, for example a Bluetooth radiation sensor. Other types of events can be programmed such that the radio recognizes a plurality of different incident events via the automated trigger.

In accordance with the various embodiments, the automated event trigger enables automatic video recording by the radio unit without manual user input to the radio. Thus, if the user of radio 102, who is likely the primary responder, is injured or busy attending to the incident, the video recording being automatically enabled without requiring any button presses or other manual user input is highly advantageous. Moving to state 130, the communication system further responds to the event trigger by performing a dynamic search which identifies one or more radio units, such as units 104, 106 and 108, which are suitable for a talkgroup.

The suitability of units for a talkgroup is based on the type of incident event indicated by the alert and the video content. For example a talkgroup can be formed based on relevance to the incident type, proximity to the incident, availability of the unit, specialized equipment, job function, and language skills to name a few. For example, for an emergency incident alert indicating explosives or a chemical spill (incident type), a talkgroup may be formed of a bio hazard unit (relevance to explosive and chemical), a canine unit (relevance to searching), and a unit which is closest to the incident (proximity). As an another example, an emergency incident alert indicating gun removal from the user's holster (trigger) during a riot (incident type), a talkgroup may be formed of units in close proximity having riot gear protection (relevance), such a face masks, and body padding. Radios having intelligent audio can also be triggered by predetermined voice commands. Radios having intelligent audio always have an active microphone (sometimes referred to as a "hot mic") that automatically adjusts the level of the speaker depending on the level of ambient noise. Thus, a radio programmed to recognize certain voice commands can be used to trigger video. These examples are provided to better describe the advantageous benefits of the application and are not intended to be limiting. The automated trigger type and automated video recording enable the dynamic formation of a talkgroup best suited for the incident.

Moving to state 140, the video recorded by radio unit 102 is transmitted to the talkgroup formed of units 104, 106, 108. The three units 104, 106, 108 of the talkgroup are thus able to view real-time video of events as they approach the incident scene. Thus, units 104, 106, and 108 are able to be far better prepared to address the incident.

Figure 2:
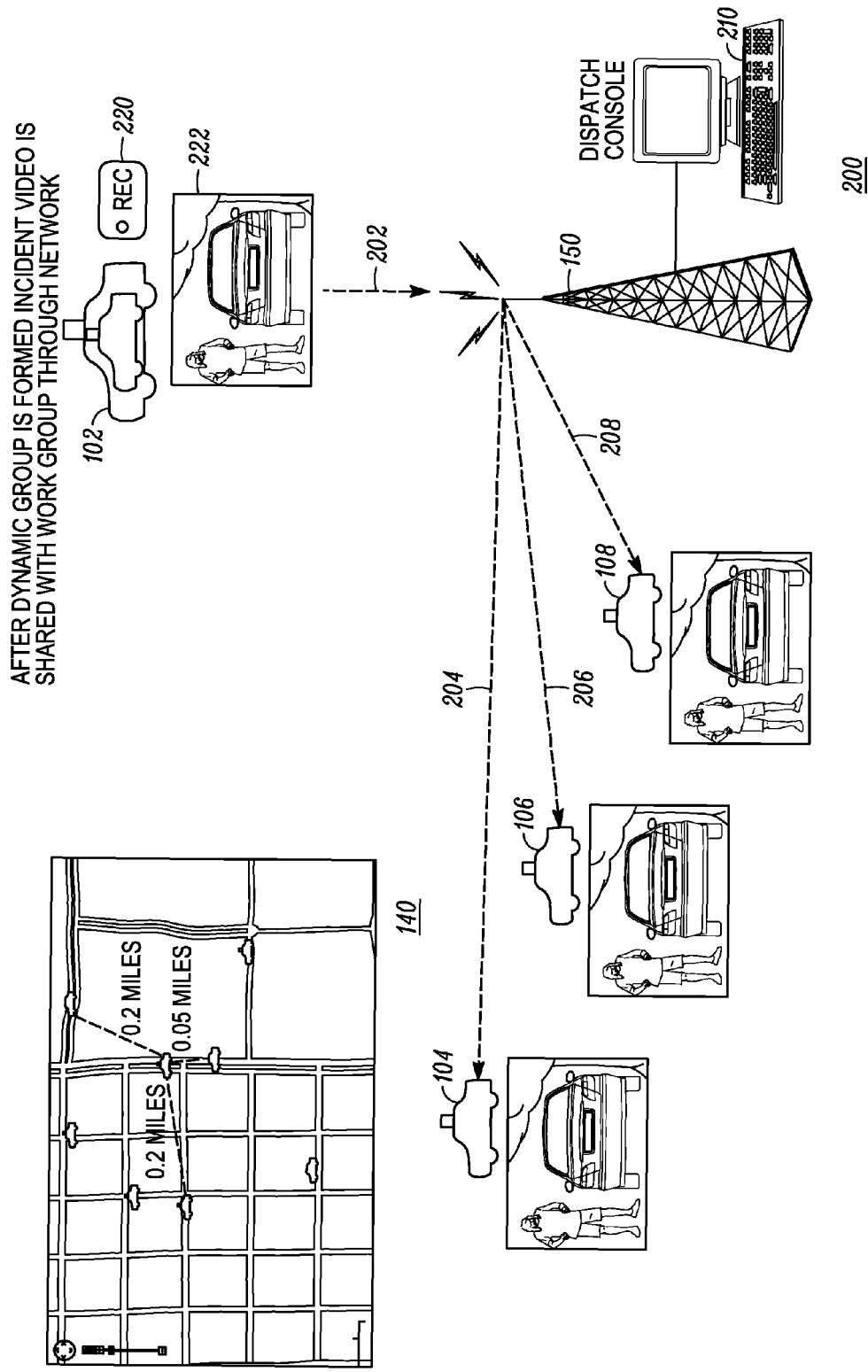
FIG. 2 is a pictorial representation of the communication system operating in accordance with an embodiment.
Figure 3:
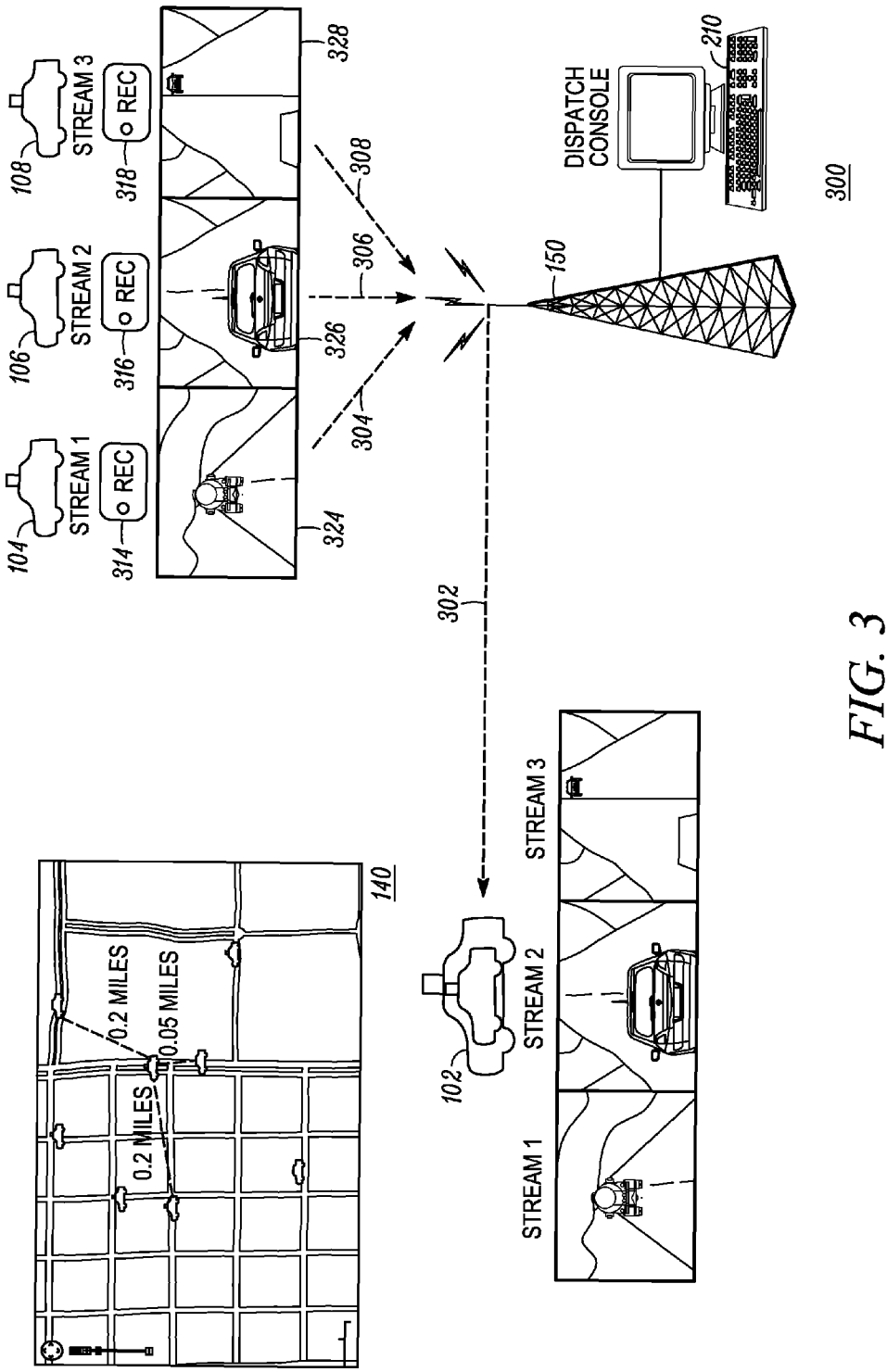
FIG. 3 is pictorial representation of the communication system operating in accordance with another embodiment.

FIGS. 2 and 3 show examples of pictorial implementation embodiments for the communication system of FIG. 1. Briefly, FIG. 2 shows an example of a one-to-many embodiment, and FIG. 3 shows an example of a many-to-one embodiment. Both embodiments automatically share video amongst a dynamically formed talkgroup in response to a triggered event.

Referring to FIG. 2, there is shown a representation for operating state 140 in which vehicular radio unit 102 records 220 incident events 222 occurring at a scene. The recording 222 is transmitted via a streamlined digital signal 202 to the communication system's tower 150. The recording 222 may also comprise a radio ID, date stamp, time stamp, sensor data and location as part of log information. The log information may be used to authenticate and substantiate the video recording for future evidentiary purposes.

The central control station 210, for example a dispatch center or incident commander, receives signal 202 and establishes a talkgroup based on the type of event indicated by the trigger and analysis of the incident video. The recorded signal of incident events 222 is then re-transmitted via signals 204, 206, 208 to the units 104, 106, 108 within the talkgroup. This one-to-many embodiment, allows radio units 104, 106, 108 of the talkgroup approaching the incident scene to be better prepared for the incident.

FIG. 3 shows a representation for operating state 140 in which each of the radio units 104, 106, 108 of the talkgroup respectively records 314, 316, 318 in-route video 324, 326, 338 as the units approach the incident scene. These in-route recordings are transmitted via signals 302, 304, 306 to tower 150, which saves the recordings to the central control station 210. Thus, the camera operates as an accessory to the radio system. The in-route recordings 324, 326, 328 preferably include radio ID, date stamp, time stamp and location information as part of a log. This log can be used to facilitate studying the manner in which units have responded to an incident. The in-route video recordings 324, 326, 328 may contain additional evidence pertaining to the incident, and are thus potentially useful for future evidentiary proceedings. For example, a person fleeing the incident scene may have his/her image or the image of an escape car captured on one of these in-route recordings. The tower 150 and control station 210 may also retransmit the in-route video as streamlined signals over transmission signal 308 to the initial responding unit 102, if the system is so configured.

For the scenario in FIG. 3, the video recording may be performed by a remote speaker microphone (RSM) having a camera for capturing video while attached to the portable radio, with the portable radio managing the wireless video transmissions; or an accessory with video capability that pairs directly with the mobile two way radio in the car that is either mounted somewhere on the car or worn on the officer (for example shoulder mount or head mount). Again, with all the embodiments, the camera is operating as an accessory to the radio system.

Thus, the communication system 100 operating in accordance with the various embodiments described in FIGS. 1, 2, and 3 provide radio(s) which automatically capture video in response to an event trigger and share the captured video amongst members of a talkgroup, wherein the talkgroup is dynamically formed based on the type of event, and the type of event being determined by the trigger type and the video captured at the incident scene. The communication system 100 integrates streaming video along with local and network storage functionality thereby facilitating buffering, transmission, and storage of the video data. The ability to automatically enable video capture in an emergency situation and sharing the video over the network allows for appropriate responders to be assigned to an incident and for the assigned responders to be better prepared for the incident.

While FIGS. 1, 2, and 3 have shown vehicular radio units, the embodiments of the invention apply to video capable wearable devices, and exemplary embodiments of these devices will be discussed later. In mission critical applications, the availability of personnel to respond to an incident quickly and efficiently is imperative. The communication system operating in accordance with the various embodiments provides an independent, integrated solution allowing evidence to be collected during an incident, such as during a police stop or disaster scene. The radio user interface for management of automated alert, video recording, talkgroup formation and sharing of information improves the user experience by eliminating the need to have a user manipulate or adjust any settings.

The ability of monitoring self and/or the talkgroup member video provides an advantage for quick current video analytics as well as for future analytics. Accessing the camera footage can be advantageously accessed approaching an incident, at the incident, and after the incident. The use of time and location stamps further facilitates authenticating the data for future retrieval.

Figure 4:
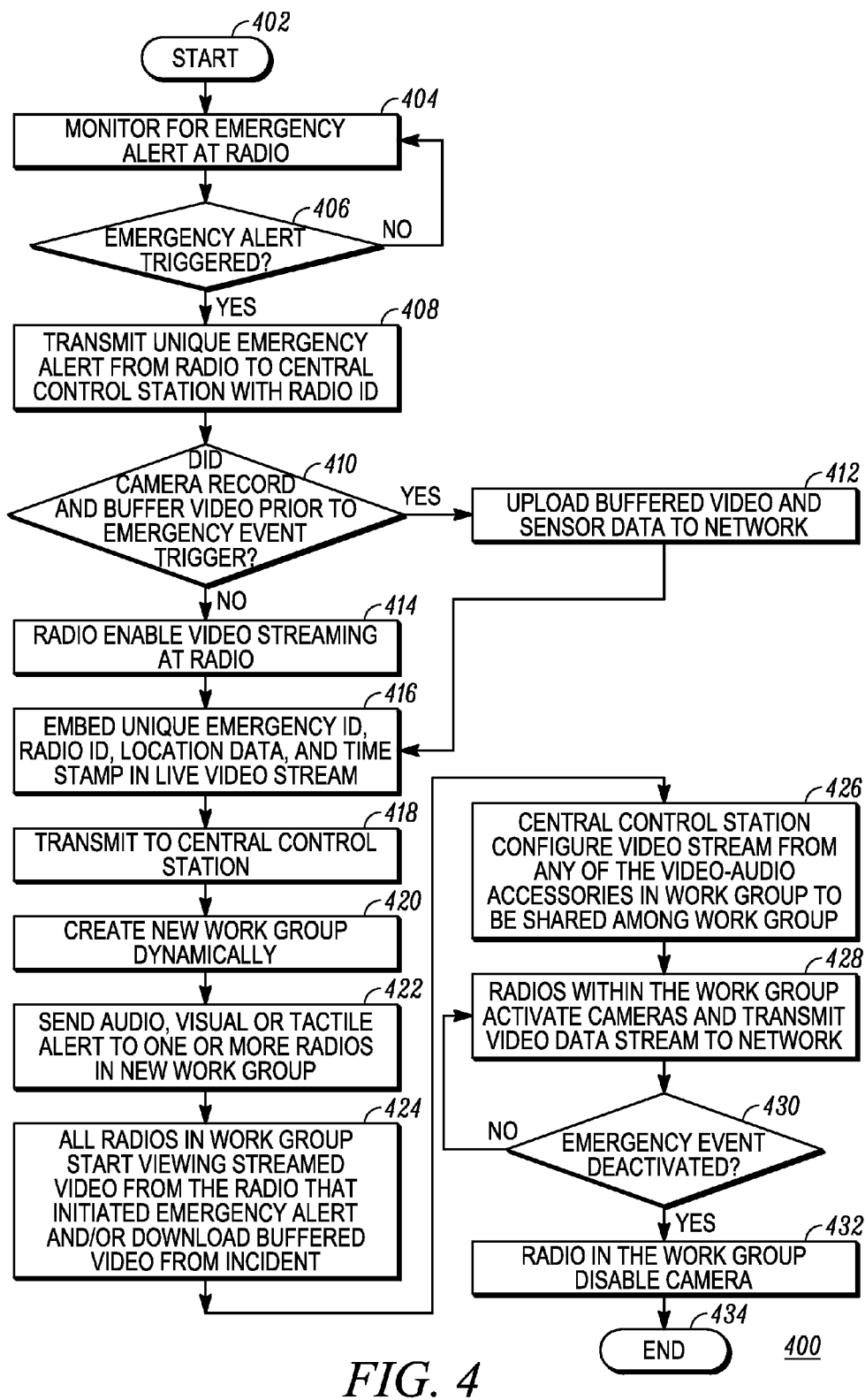
FIG. 4 is a flowchart of a method for responding to an alert within a communication system operating in accordance with the various embodiments.

FIG. 4 is a flowchart of a method for responding to an incident event alert within a communication system operating in accordance with the various embodiments. Method 400 begins at 402 by monitoring for an incident event alert, referred to in this embodiment as an emergency alert, at the radio at 404. For example, the radio may monitor wired or wireless sensors, such as a gun holster switch, radiation sensor, biosensor, and the like. At 406, a determination is made whether an emergency alert has been triggered, and if not then monitoring continues at 404. As described earlier, specific or predetermined incident events enable the trigger. For example, a switched physical event like a gun being drawn from a holster, an audio event like a gunshot, and/or a sensed event like a bio hazard condition. If an emergency alert is triggered at 406, then the radio transmits a unique emergency alert and radio ID at 408. This unique emergency alert may be dependent on the type of event, such as for example, a gun holster switch being triggered, a radio sensor detecting an elevated radiation level, and the like. The unique emergency alert is transmitted to the central control station.

A check is made at 410 to determine if the camera was recording and buffering any video prior to the emergency alert. If the camera was recording and buffering information, then this buffered video and sensor data is uploaded to the central control station at 412. If no previous recording was made at 410, then the radio proceeds to enable video streaming at 414. The camera, which may be in the radio (coupled to the vehicular or handheld portable) or part of an accessory coupled to the radio, is turned on and begins recording. The recorded video is transmitted to the central control station at 418. Prior to transmitting the video stream, the unique emergency ID, radio ID, location data and time stamp are preferably embedded in the stream. This embedded information can facilitate usage of the information at a later date for evidentiary purposes.

For the current incident at hand, the central control station creates a new talkgroup, which may also be referred to as a work group at 420. The talkgroup is formed based on relevance to the event type, and parameters, such as proximity to the incident scene, availability, job function to name a few. The video stream, the sensor data (if applicable) along with audio is sent to the talkgroup at 422. The radios within the talkgroup start viewing the streamed video at 424. Thus, the radios of the talkgroup are able to view the incident scene in real time by viewing the video from the radio that initiated the emergency alert. The radios of the talkgroup can also view the buffered video to analyze events leading up to the incident.

The radios in the talkgroup may also activate their own cameras and transmit video-data streams to the central control station. This allows various vantage points to be viewed as the radios of the talkgroup approach the incident scene. Again, the central control station at 428 can transmit this video stream out to members of the group if desired or retain and store the information for future evidentiary purposes.

Once the emergency event is deactivated at 430, the radios in the talkgroup turn off their cameras at 432, ending the process at 434.

Accordingly, the automated event driven emergency alert provided by method 400 allows emergency information to be shared among dynamically established work groups without the user to manually press any button to initiate video recording or talkgroup formation. The communication system 100 and method 400 allows automatic event-driven logging during emergency events. Automatic event driver logging negates the need for any user input to the radio, thereby allowing the user to focus on the incident rather than the radio.

Figure 5:
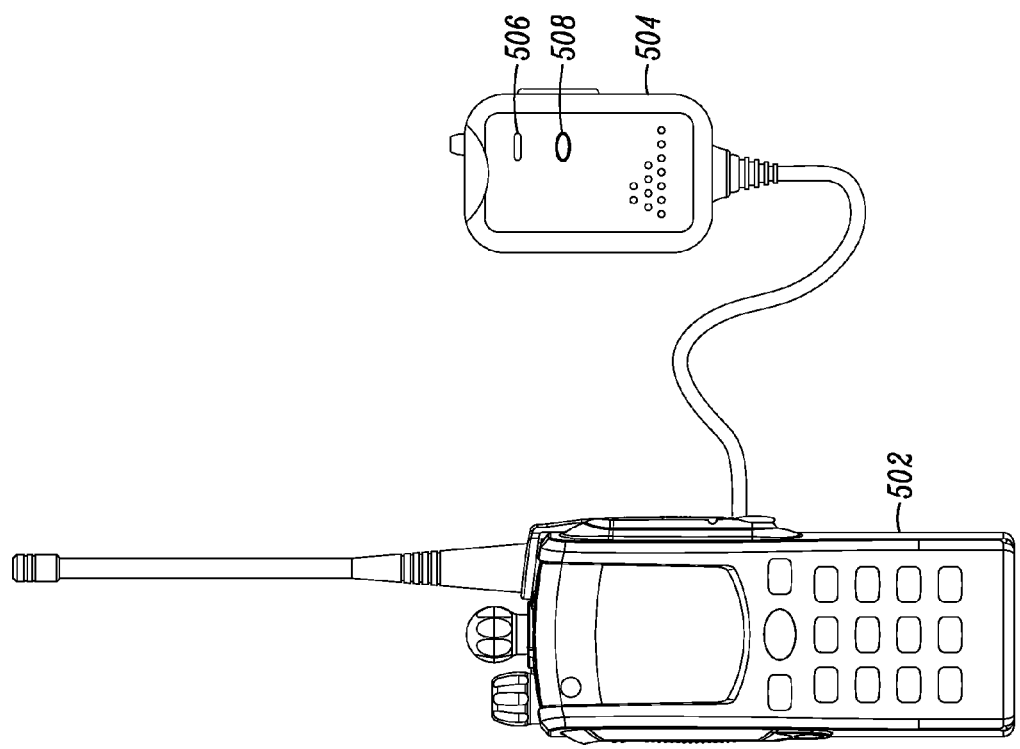
FIG. 5 is a portable two-way radio and accessory having camera capability operating in accordance with an embodiment.

Video capable wearable devices are highly valued by public safety personnel working in the field. Past wearable devices have been restrictive and lacked a fully integrated solution. FIG. 5 shows a portable two-way radio 502 having an accessory 504 coupled either wired or wirelessly thereto in accordance with the various embodiments. The accessory 504 may be for example, a remote speaker microphone which is coupled with a digital camera 506. The radio and/or accessory is programmed to respond to predetermined events to trigger automatic video recording. As previously described, the predetermined events may include but are not limited to, physical events, such as a gun being drawn from the user's holster, an audio event such as a gunshot or voice command, and/or a sensed event such as a bio hazard condition. Hence, the accessory 504 and/or radio 502 may further comprise a sensor 508 for sensing hazardous conditions, such as smoke, radiation levels, man down, carbon monoxide, or methane gas to name a few.

The radio 502 comprises a controller having a microprocessor, a memory, and two-way radio transceiver for two-way radio communication as previously described in conjunction with FIG. 1. The microprocessor, transceiver, sensor (if applicable) and camera provide emergency alert capability which triggers the sharing of real time visual incident information to a talkgroup. The talkgroup is dynamically formed based the type of event, job function, skill set, and/or location to name a few. For example a talkgroup can be formed of a SWAT unit, canine unit, hazardous waste control unit, and/or a forensic unit operating within a predetermined distance from the incident or operating within a particular zone. Thus, different talkgroups may be formed to respond to different types of incident event alert triggers.

The remote speaker microphone 504 is typically worn at the user's lapel/shoulder making it ideal for the camera 506 to record video events or changes occurring at an incident scene and/or events surrounding the user, which in many cases involve a police officer. The real-time video recorded by camera 506 is transmitted as previously described. Unlike past wearable devices which have been restrictive and required a variety of separate independently operated components, the radio 502 and radio accessory 504 provide a fully integrated approach for radio communication and sharing of real-time video with other radio units (handheld, vehicular, and central control station units).

Figure 6:
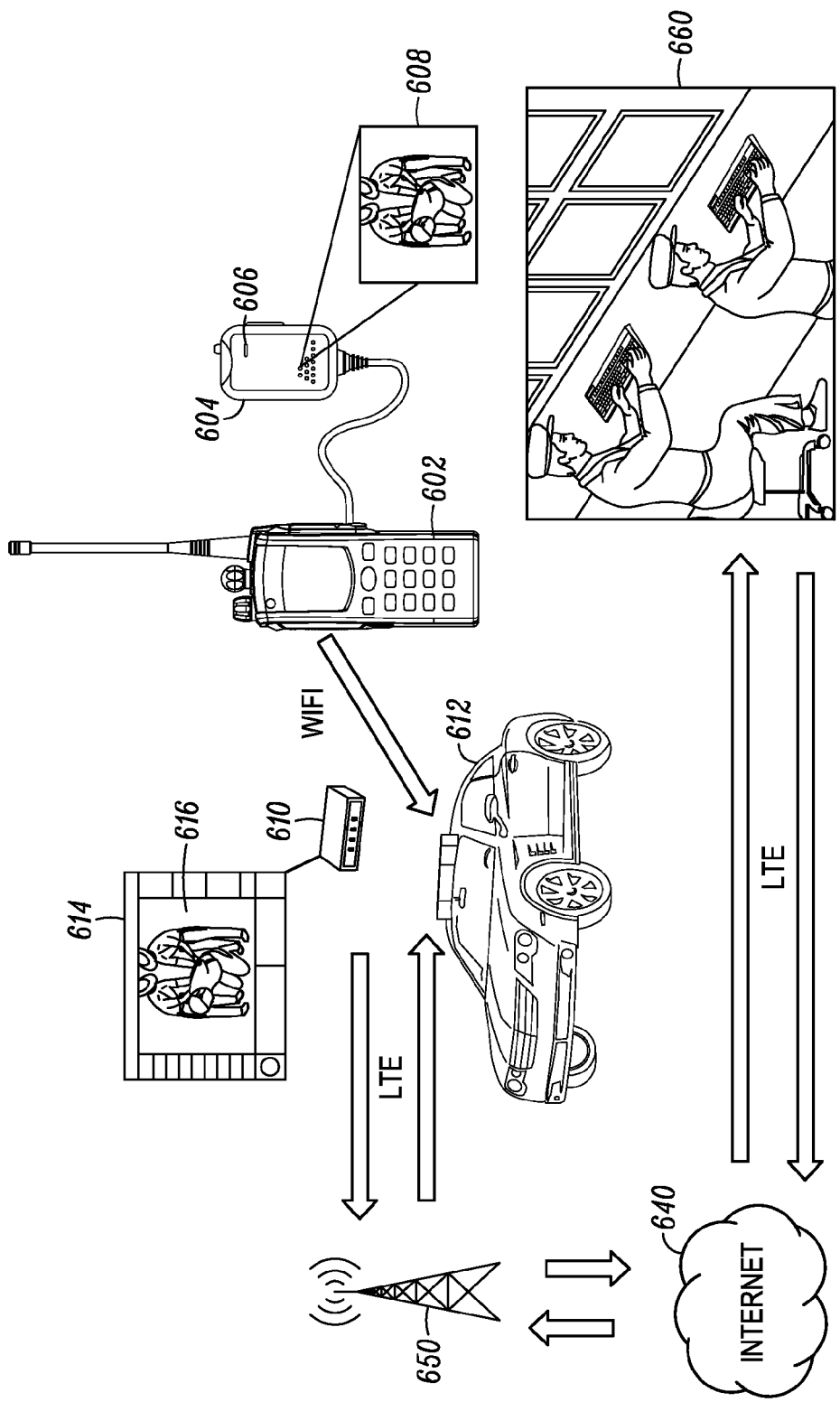
FIG. 6 is an example of a communication system having a portable radio with remote speaker microphone having camera capability and a vehicular radio operating in a talkgroup responding to an incident in accordance an embodiment.
Figure 7:
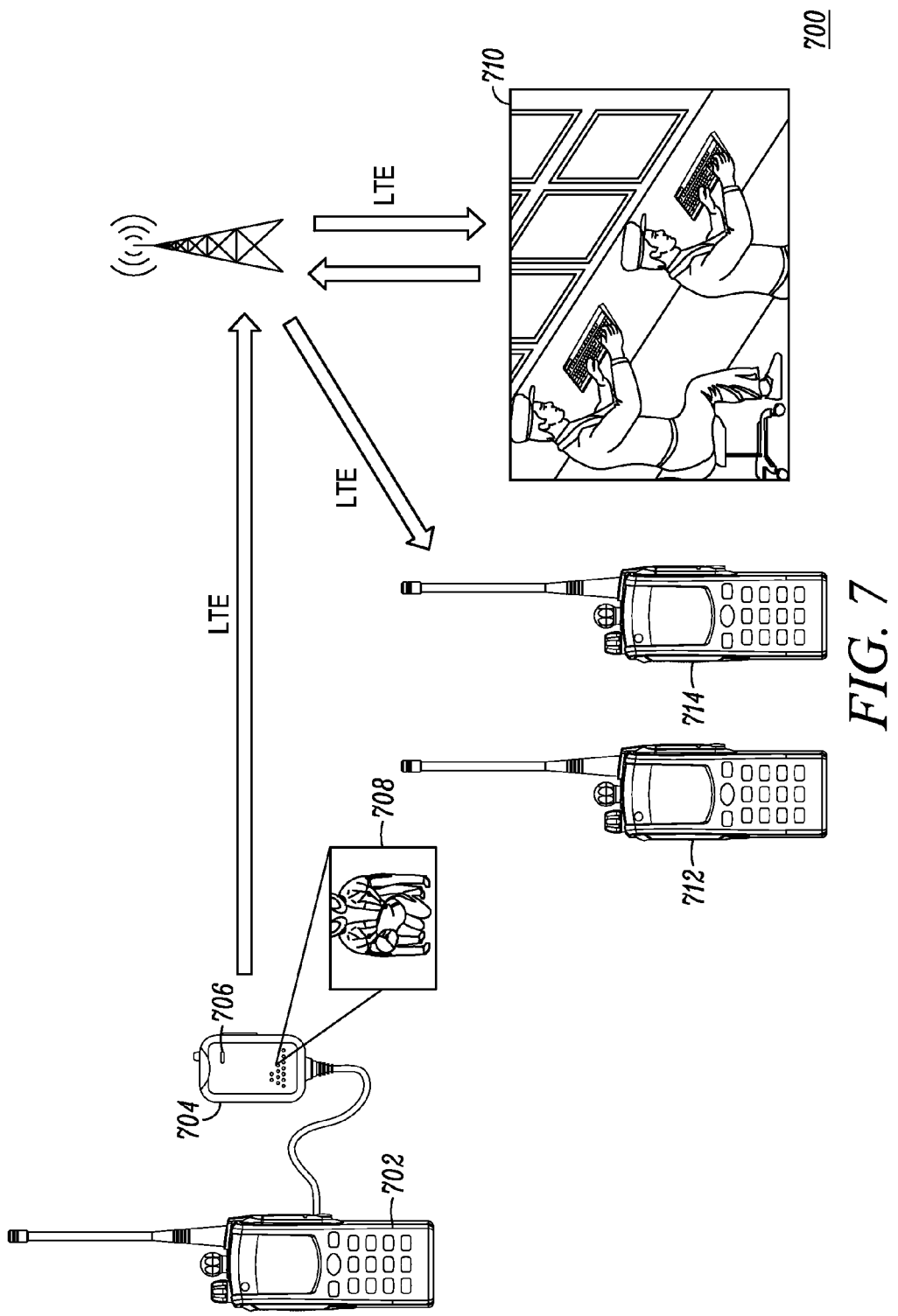
FIG. 7 is an example of a communication system having a portable radio with remote speaker microphone with camera capability operating in a talkgroup responding to an incident in accordance an embodiment.

FIGS. 6 and 7 provide some pictorial implementation examples of the communication system operating in accordance with the various embodiments.

FIG. 6 shows a communication system 600 operating in accordance with the embodiments of the invention. Communication system 600 comprises a two-way portable handheld radio 602 having accessory 604 wired (or could be wirelessly) coupled thereto. The remote speaker microphone 604 comprises camera 606 which automatically records video 608 in response to the radio receiving an incident event alert trigger. In response to the trigger, the remote speaker microphone's camera 606 records video 608 at the scene. The integration of the camera within the radio system advantageously provides a camera ecosystem which allows the video to be either locally streamed to another radio 610 within WiFi range, or streamed over a wide area network 650 via the radio 602 connected to the camera 606. A digital video recorder (DVR) can receive the video signal to be stored in the car either from a camera that is in proximity to the vehicle, or over the wide area network 650/640 if the first responder goes out of WiFi range.

Hence, the users of vehicle 612, such as police officers of a police cruiser, can monitor 614 the ongoing events of the incident scene via vehicular radio 610. Vehicular radio 610 comprises a display 616 allowing video to be monitored as the vehicle approaches the incident scene. This real-time video allows the officers in the vehicle 612 to be better informed and prepared upon arrival at the scene.

Additionally, and as discussed earlier the vehicles themselves may be recording their own video and transmitting this back to the dispatch control center 660 via wide area network 650 so that various vantage points may be recorded and stored which may be accessed at a later date for evidentiary reasons.

FIG. 7 shows a communication system 700 operating in accordance with the embodiments of the invention. Communication system 700 comprises a portable radio 702 having an accessory in the form of a remote speaker microphone (RSM) coupled (wired or wirelessly) thereto. The remote speaker microphone 704 includes a camera 706 or other visual recordation device recording an incident scene 708. The video is broadcast to a central control station 710, shown here as a dispatch center, over an LTE frequency. A talkgroup, 712, 714 is formed based on the video reviewed at the dispatch center 710 in the manner previously described. A talkgroup may comprise one or more radios receiving information from the dispatch center. The real-time video and sensor data (if applicable) allows units having the appropriate skill sets to be assigned to the talkgroup. For example, events dealing with explosives might be assigned to a talkgroup encompassing a canine unit and a biohazard unit. The recorded scene is transmitted to radios within the talkgroup 712, 714. Thus, radios within the talkgroup 712, 714 receive real-time updates as to events and changes occurring at the incident scene.

Accordingly, an improved communication system for incident response has been provided. Public safety personnel are no longer limited to audio status updates. The automated event driven emergency alert allows incident information to be shared among dynamically established talkgroups without the user needing to manually press any button to initiate video recording or talkgroup formation. Event driven emergency alerts allows officials at the incident scene to focus on critical tasks. The ability to seamlessly share video and data from the incident scene helps better prepare public safety personnel within the talkgroup to handle the incident. The ability to further record video and data as personnel within the group approach an incident may provide an additional valuable record for future use. The incorporation of alert driven video/data recording and talkgroup formation is highly desirable for radios operating over public safety radio networks, such as long term evolution (LTE) bandwidths.

The automated emergency alert being triggered permits the tight collaboration between radios in a talkgroup enabling the sharing of data during an emergency event. Tight collaboration between radios in a talkgroup advantageously allows data sharing during an emergency event which has been previously unavailable.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A communication system, comprising:
    a radio having a camera, the radio being responsive to an incident event trigger, the camera automatically recording video in response to the incident event trigger; and
    at least one more radio forming a talkgroup with the radio having the camera in response to both the incident event trigger and content of the recorded video, the video being automatically shared amongst radios of the talkgroup.

2. The communication system of claim 1, further comprising a central control station for forming the talkgroup in response to the incident event trigger based on the incident causing the trigger and content of the recorded video.

3. The communication system of claim 1, wherein sensor data is collected in response to the incident event trigger, and the recorded video and the sensor data are shared amongst radios of the talkgroup.

4. The communication system of claim 1, further comprising:
    a central control station; and
    wherein the radio embeds log in information into the video recording and transmits the video to the central control station.

5. The communication system of claim 4, wherein the log in information comprises at least one of: an emergency ID, a radio ID, location stamp, and time stamp.

6. The communication system of claim 1, wherein the talkgroup is dynamically formed based on at least one of: job function, skill set, equipment, and location.

7. The communication system of claim 1, wherein the video is buffered locally at the radio and transferred to a central control station for retransmission to the talkgroup.

8. The communication system of claim 1, wherein video of an incident scene associated with the incident event trigger is provided in real-time to the talkgroup and stored for later retrieval after the incident.

9. The communication system of claim 1, wherein the video is automatically logged without user input to the radio.

10. The communication system of claim 1, further comprising:
    a radio accessory coupled to the radio, and the radio accessory comprises the camera.

11. The communication system of claim 1, wherein the radio having the camera comprises a vehicular two-way radio.

12. The communication system of claim 1, wherein the camera operates as an accessory to the radio.

13. The communication system of claim 1, wherein the incident event trigger comprises at least one of: a physical event, an audio event, and a sensed event.

14. The radio of claim 1, wherein the radio further comprises a sensor, and sensor data is embedded in the video.

15. The communication system of claim 1, wherein the radio comprises an active microphone which automatically adjusts audio level of a speaker based on level of ambient noise.

16. A radio, comprising:
    a camera operatively coupled thereto for recording video of incident scene information in response to an incident event alert received at the radio, the incident event alert triggering formation of a talkgroup for viewing the video of the incident scene information in real-time, wherein the formation of the talkgroup is based on both an incident causing the trigger and content of the recorded video.

17. The radio of claim 16, wherein the radio comprises a handheld portable two-way radio or a vehicular two-way radio.

18. The radio of claim 16, further comprising a radio accessory coupled to the radio, the camera being located in the radio accessory.

19. The radio of claim 18, wherein the radio accessory comprises remote speaker microphone.

20. The radio of claim 16, wherein the radio receives sensor data indicating a hazardous condition which triggers the incident event alert.

21. The radio of claim 16, wherein the radio comprises a sensor and sensor data is embedded in the video.

22. The radio of claim 16, further comprising an active microphone which automatically adjusts audio level of a speaker based on level of ambient noise.

23. A method for sharing information in a communication system, comprising:
    receiving a trigger at a radio of the communication system, the trigger indicating that an incident has occurred;
    automatically recording video, by the radio, of the incident;
    dynamically forming a talkgroup within the communication system based on both the incident causing the trigger and content of the recorded video; and
    automatically sharing the video amongst the formed talkgroup.

24. The method of claim 23, further comprising:
    recording video using radios of the talkgroup responding to the incident; and
    transmitting the video recorded by the talkgroup to a central control station.

25. The method of claim 24, further comprising:
    transmitting the video recorded by the talkgroup to the radio at the incident.

26. The method of claim 23, wherein the talkgroup is formed by a central control station based on the type of incident that caused the trigger and content of the recorded video.

27. The method of claim 23, wherein the talkgroup is formed based on the type of incident event that caused the trigger and content of the recorded video, and sensor data.

28. The method of claim 23, further comprising:
    logging and storing the shared video at a central control station.

29. The method of claim 23, wherein the radio comprises an active microphone which automatically adjusts audio level of a speaker based on level of ambient noise.

* * * * *

UNITED STATES PATENT AND TRADEMARK OFFICE
CERTIFICATE OF CORRECTION

| | | |
|---|---|---|
| PATENT NO. | : 8,805,431 B2 | Page 1 of 1 |
| APPLICATION NO. | : 13/562657 | |
| DATED | : August 12, 2014 | |
| INVENTOR(S) | : Vasavada et al. | |

It is certified that error appears in the above-identified patent and that said Letters Patent is hereby corrected as shown below:

IN THE SPECIFICATION:

In Column 1, Line 42, delete "is" and insert -- is a --, therefor.

IN THE CLAIMS:

In Column 10, Line 4, in Claim 14, delete "The radio" and insert -- The communication system --, therefor.

Signed and Sealed this
Twenty-fourth Day of May, 2016

Michelle K. Lee
*Director of the United States Patent and Trademark Office*